Nov. 15, 1927.                                                    1,649,702
G. G. JOHNSTON
CONVERTIBLE VEHICLE SEAT
Original Filed July 17, 1924        2 Sheets-Sheet 1

Inventor:
Gordon George Johnston
By
Attorney.

Nov. 15, 1927. 1,649,702
G. G. JOHNSTON
CONVERTIBLE VEHICLE SEAT
Original Filed July 17, 1924  2 Sheets-Sheet 2
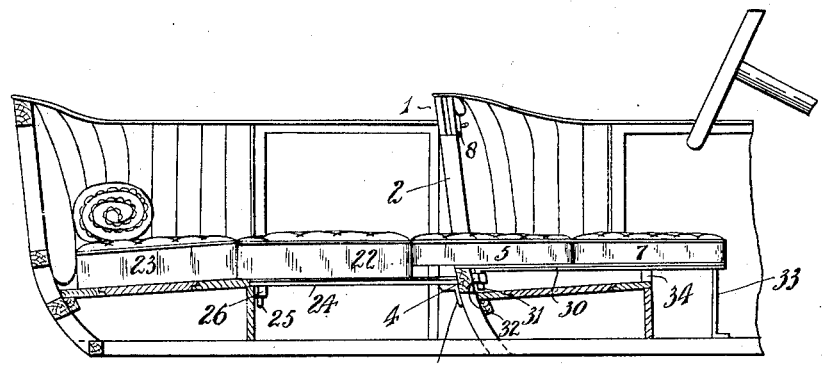
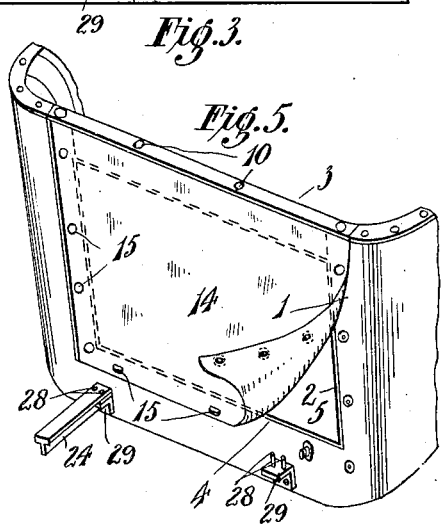
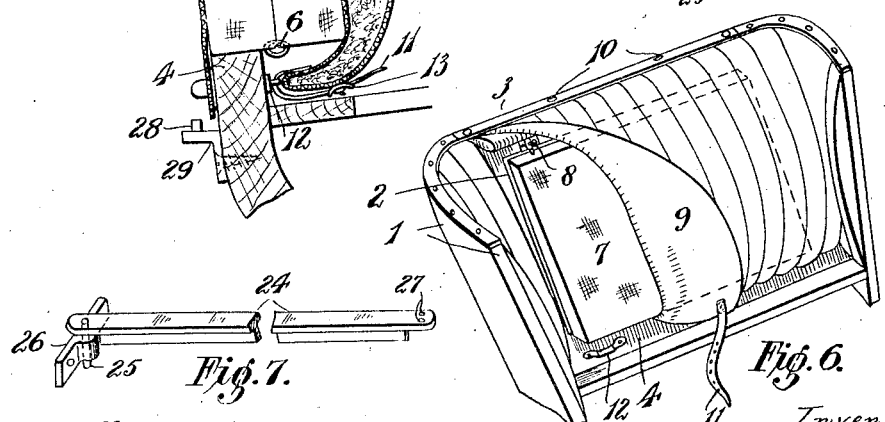
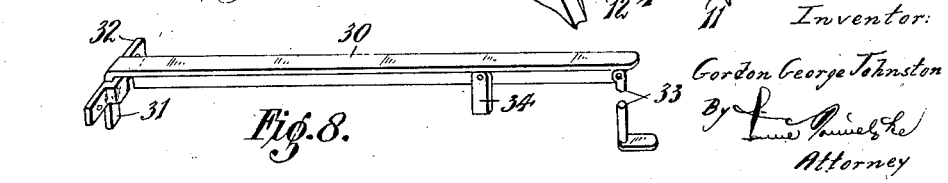
Inventor:
Gordon George Johnston
Attorney Patented Nov. 15, 1927.

1,649,702

UNITED STATES PATENT OFFICE.

GORDON GEORGE JOHNSTON, OF MORUYA, NEW SOUTH WALES, AUSTRALIA.

CONVERTIBLE VEHICLE SEAT.

Application filed July 17, 1924, Serial No. 726,603, and in Australia November 14, 1923. Renewed August 18, 1927.

This invention relates to improvements in and connected with the seats of touring motor-cars whereby the same can be readily and conveniently converted to provide a couch that will afford comfortable sleeping accommodation for one or more of the occupants of the vehicles.

Prior constructions of convertible seats in motor-cars for the purpose mentioned involve the pivotal or hinged connection to the body of the front seat-back, which is adapted to be downfolded into an approximately horizontal plane to occupy the space between the front and tonneau seats and thus provide a three section mattress or couch. These constructions have not been completely satisfactory, due principally to the non-rigidity of the frames of the convertible seats and the liability of connecting parts working loose and getting out of order owing to the vibration of the vehicles and to other strains transmitted under road travelling conditions.

According to my invention, a substantially rectangular opening is formed in the frame of the forward seat-back, said opening being disposed between the upper and lower cross members or rails of said frame. Detachably fitted in said opening are two hingedly connected cushions, which are folded together and are covered at the front by detachable upholstery, while a hinged flap fastened to the upholstery covers said cushions at the rear. The hingedly connected cushions thus accommodated in the frame of the front seat-back are adapted to be downwardly folded and extended to co-operate with the front and tonneau seats and provide a couch or mattress of four horizontally aligned sections, while the upholstery of said seat-back can be detached and rolled within said hinged flap to provide a comfortable pillow for the occupants when reclining in the car body. Bars are detachably affixed to the seat frames to rigidly support the cushions when in couch arrangement, and the upper rail of the frame of the front seat is removable for greater convenience in giving access to the body when the seats are converted.

In the drawings:—

Figure 3 is a longitudinal section of the motor-car body wherein the seats are converted to provide sleeping accommodation, and showing the detachable upholstery and flap rolled to provide a pillow.

Figure 4 is a sectional view on an enlarged scale of the front seat-back showing the hingedly connected cushions therein, the detachable upholstery and the hinged covering flap.

Figure 5 is a rear perspective view of the front seat-back, showing the covering flap raised to disclose the opening in the frame of said seat-back.

Figure 6 is a front perspective view of the seat-back seen in Figure 5, showing the detachable upholstery uplifted and disclosing the hingedly connected cushions.

Figures 7 and 8 are perspective views of metal bars and fittings for supporting the cushions when converted to the couch arrangement.

Figure 1:
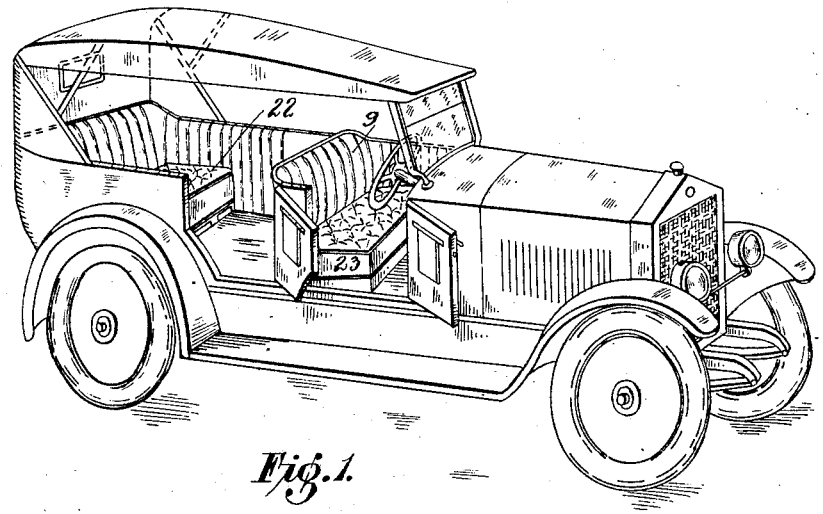
Figure 1 is a perspective view of a motor-car having the convertible seat improvements, showing that the general appearance and normal arrangement of the seats and backs are in no way affected or altered.
Figure 2:
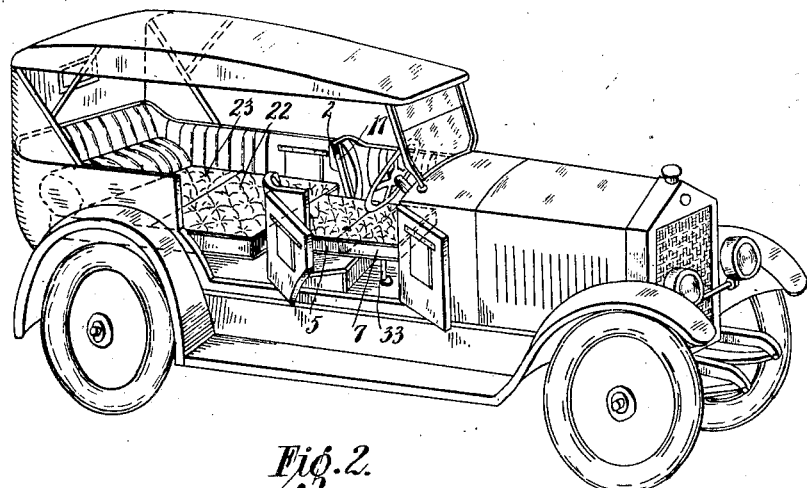
Figure 2 is a perspective view of the motor-car showing the seats and co-related integers converted to provide a couch or mattress in the car body.
Figure 9:
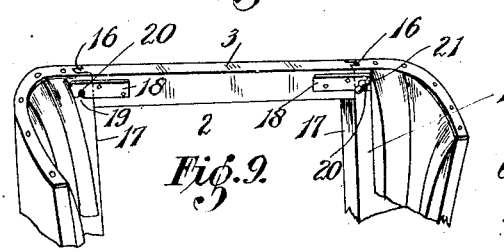
Figure 9 is a view illustrating the construction of the detachable upper rail of the frame of the seat-back, and means for rigidly maintaining the same in normal touring position.

The back-rest frame 1 of the front seat of the motor-car has a substantially rectangular opening 2 between the upper and lower cross members or rails 3 and 4, respectively, of the said frame, and this opening is nearly the full width of the car body.

Snugly and detachably fitted in the opening 2 formed in the back-rest frame is a cushion 5, which is hingedly connected at 6 to a similar cushion 7 adapted to be upwardly folded and to abut against the said cushion 5.

The cushion 5 is locked in upright position within said opening by sliding bolts 8 that are affixed to the upper rail 3, and adapted to enter holes that are formed in the framing of said cushion.

Upholstery 9 is detachably fastened by buttons 10 to the upper surface of the rail 3, and at its lower end by straps 11 that are passed through eyes 12 affixed to the lower rail 4 and adjusted by buckles 13—see Figure 4. Affixed to and depending from the upholstery of the back-rest of the forward seat is a flap 14, which completely covers the opening 2 and is detachably fastened to the frame 1 by a series of buttons 15.

The upholstery 9 normally holds the forward cushion 7 against the rear cushion 5, and when the integers of the back-rest have been assembled, said back-rest has substantially the same appearance as those in conventional seat constructions.

The upper rail 3 of the frame 1 has tenons 16 at its opposite ends adapted to be slidably accommodated in grooves that are formed in the upper end portions of the frame members 17 of the front seat-back. Metal plates 18 having open ended slots 19 are affixed to said upper rail, and bolts or studs 20 are secured to the frame members and carry wing-nuts 21. When said upper rail is slid downwardly into its normal position, the slots 19 engage said bolts or studs, whereupon the wing-nuts are tightened, thus maintaining said upper rail immovable.

When it is desired to convert the seats to provide a couch for sleeping accommodation in the car-body the tonneau cushion 22, which ordinarily is of greater width than that of the cushion 23 of the front seat, is moved forwardly to occupy the space between the front longitudinal edge of the back seat framing and the seat-back of the forward seat, in which position its rear portion rests upon and is supported by the frame of the tonneau seat—see Figure 3. The remaining portion of said cushion is rigidly supported by two longitudinal bars 24, which are preferably constructed of T-section metal and have at their rear ends studs 25 detachably fitting into holed brackets 26 secured to the frame of the tonneau seat, while the forward ends of said bars have holes 27 to accommodate upstanding pins 28 carried by brackets 29 fastened to the frame of the back-rest of the front seat of the vehicle.

The cushion 23 of the front seat is now placed rearwardly of the cushion 22 upon the frame of the tonneau seat, and the upholstery 9 is detached and rolled within the flap 14 to provide a pillow as is seen in Figure 3. The hingedly connected cushions 5 and 7 are released from the frame 1 of the back-rest of the forward seat and unfolded so that the rear longitudinal edge of the cushion 5 is in abutment with the front longitudinal edge of the cushion 22.

The cushions 5 and 7 when unfolded cooperate with said cushions 22 and 23 to provide a four section couch or mattress, and they are supported in this position by longitudinal bars 30 of T-section metal, having at their rear ends tongues 31 detachably engaging looped metal straps 32 fastened to the lower cross member or rail 4 of the framing 1, while said bars 30 are furnished at their forward ends with hinged legs 33 adapted to rest upon the floor of the car body and support the forward end of the cushion 7 at a required elevation.

In lieu of the hinged legs 33, the supporting bars 30 may be furnished with short props 34 adapted to rest upon the front portion of the frame of the forward seat, but both the legs 33 and the props 34 may be employed as is shown in Figure 3.

The length of the legs 33 (or of the short props 34) and the location of the brackets 26, 29 and 32 are such that when the cushions 22, 23, 5 and 7 are placed in juxtaposition, they are approximately in horizontal alignment, thus providing a comfortable couch or mattress for sleeping accommodation for one or more occupants in the car body, such as has been found desirable under camping conditions or for emergency ambulance purposes, while the ready detachability of the upper rail 3 of the frame of the back-rest of the front seat enables access to be conveniently had to said couch or mattress.

It will be understood that when the seats and the seat cushions are in normal touring arrangement, the supporting bars 24 and 30 are detached from their co-related fittings and are packed together and suitably accommodated beneath the rear seat of the vehicle as is customarily done with tools and other motor-car accessories or adjuncts.

It will be appreciated that the herein described improvements can be embodied in automobile bodies in the course of their construction, but, moreover, may be applied to automobiles now already in use without requiring any structural alterations in the design and disposition of the bodies of such vehicles.

What I do claim is:—

1. A convertible vehicle seat, comprising a frame embodying connected back and side members, said back having a substantially-rectangular opening formed entirely through it, and horizontal top and bottom rails located above and below the same; a cushion unit consisting of two cushions hinged together to enable them to be folded back to back and disposed within the frame opening, and to be unfolded and extended in alining relation into a horizontal position in which they project in opposite directions through and beyond said opening so as to form a couch or mattress section, the top rail being removably mounted in the frame to enable its detachment when the seat is to be converted into a couch; releasable means for normally locking said rail in place in said frame; and covering means connected to the seat frame and extending across the opposite faces of the folded cushion unit when in place in said opening, but detachable from the frame to permit the unfolding of said unit and the removal of said top rail.

2. A convertible vehicle seat, comprising a frame embodying connected back and side members, said back having a substantially-rectangular opening formed entirely through it, and horizontal top and bottom rails located above and below the same; a cushion unit consisting of two cushions hinged together to enable them to be folded back to back and disposed within the frame opening, and to be unfolded and extended in alining relation into a horizontal position in which they project in opposite directions through and beyond said opening so as to form a couch or mattress section, the top rail being removably mounted in the frame to enable its detachment when the seat is to be converted into a couch; releasable means for normally locking said rail in place in said frame; and means for releasably retaining the folded cushion in place in said opening.

In testimony whereof I affix my signature.

GORDON GEORGE JOHNSTON.